Patented Oct. 30, 1951

2,572,867

UNITED STATES PATENT OFFICE 2,572,867

RODENTICIDE COMPRISING FLUOROACET-PHENYLHYDRAZIDE

Leonard Karel, Silver Spring, and Benjamin Witten, Baltimore, Md.

No Drawing. Application February 25, 1949, Serial No. 78,454

1 Claim. (Cl. 167—46)

(Granted under the act of March 3, 1883, as amended April 30, 1928; 370 O. G. 757)

This invention relates to rodenticides, and more particularly to a novel rodenticide that is substantially insoluble in water.

Prior rodenticides, such as fluoroacetate, known in industry as "1080," have had the disadvantage that they were critically soluble in water, which seriously restricts their use and effectiveness.

The present invention has provided a new rodenticide in the form of fluoroacetphenylhydrazide which has proven to be practically insoluble in water and of greatly improved efficiency. Fluoroacetphenylhydrazide may be expressed by the following formula:

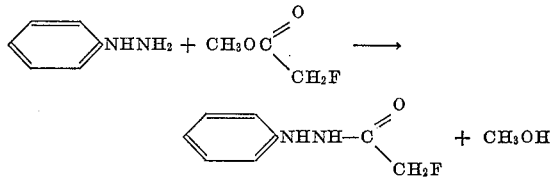

Example 1

This compound may preferably be obtained in its laboratory form in the following manner:

Add 1 ml. methyl fluoroacetate (1.17 g., 0.0127 mole) to 1.2 ml. phenylhydrazine (1.3 g., 0.0122 mole). Heat in boiling water for two hours. Cool in ice to crystallize. Collect the crystals on a filter and wash with 1-2 ml. cold benzene. Yield is near quantitative. These crystals have a melting point of 103.6° to 105° C.

Example 2

When prepared commercially in its relatively impure form fluoroacetphenylhydrazide has a pronounced tan color. It is obtained by crystallization as described in Example 1, with 10 parts of fluoroacetate heated with 12 parts of phenylhydrazine. It is preferred, when using fluoroacetphenylhydrazide as a commercial rodenticide, to add a coloring matter to the rodenticide so that the color will act as a warning against accidental use of the rodenticide for other purposes. Such coloring matter may be in the form of any suitable insoluble dye, such as du Pont "Oil Blue," a dye well known in the art, added in an amount to give the concentration of color desired.

Tests have proven that when fluoroacetphenylhydrazide is used in doses as small as 10 grams of fluoroacetphenylhydrazide per kilo. of edible matter it has proven lethal to large percentages of the various animals tested. Doses of from 1-2% of fluoroacetphenylhydrazide mixed with corn meal produced a 100% lethality in rats. Toxicity and acceptability tests on other types of rodents have also proven extremely effective. Furthermore, fluoroacetphenylhydrazide is unusually stable. It remains stable after storage at 65° C., after irradiation by filtered ultra-violet light, and after heating to fusion.

The insolubility of the rodenticide of the present invention affords many hitherto unobtainable advantages over prior rodenticides which have varied degrees of solubility in water. Most important of all, the rodenticide of the present invention is not affected or leached out by water, moisture or outside exposure to extreme weather conditions. It tends to remain where placed, but if it should be carried away by currents of water, as in a barnyard, it would not contaminate sources of drinking water, and it would merely settle to the bottom of a container of water. When coloring matter is used, the fluoroacetphenylhydrazide would become apparent in any appreciable concentrations that might have collected in drinking water.

The present invention is not limited to the preferred examples herein described, but includes all of its embodiments and modifications within the spirit and scope of the appended claim.

We claim:

A rodenticide comprising a mixture of corn meal and fluoroacetphenylhydrazide that contains approximately 1% of fluoroacetphenylhydrazide.

LEONARD KAREL.
BENJAMIN WITTEN.

REFERENCES CITED

The following references are of record in the file of this patent:

UNITED STATES PATENTS

| Number | Name | Date |
|---|---|---|
| 2,177,598 | Herzig et al. | Oct. 24, 1939 |
| 2,390,848 | Richter | Dec. 11, 1945 |

OTHER REFERENCES

Gatterman et al.: Berichte der Deutsche Chemische Gesellschaft, vol. 25, pp. 1080. (Copy in Pat. Off. Lib.)

McCombie et al.: Nature, September 14, 1946, vol. 158, pp. 382–385.

Science, vol. 102, No. 2644, pp. 232, 233, August 31, 1945.

Siegler et al.: J. Econ. Ent., vol. 39, No. 3, p. 416, June 1946.

Karel: J. Pharmacol. and Exptl. Therap., vol. 63, No. 3, pp. 287–293, July 1948.